Figure 1:
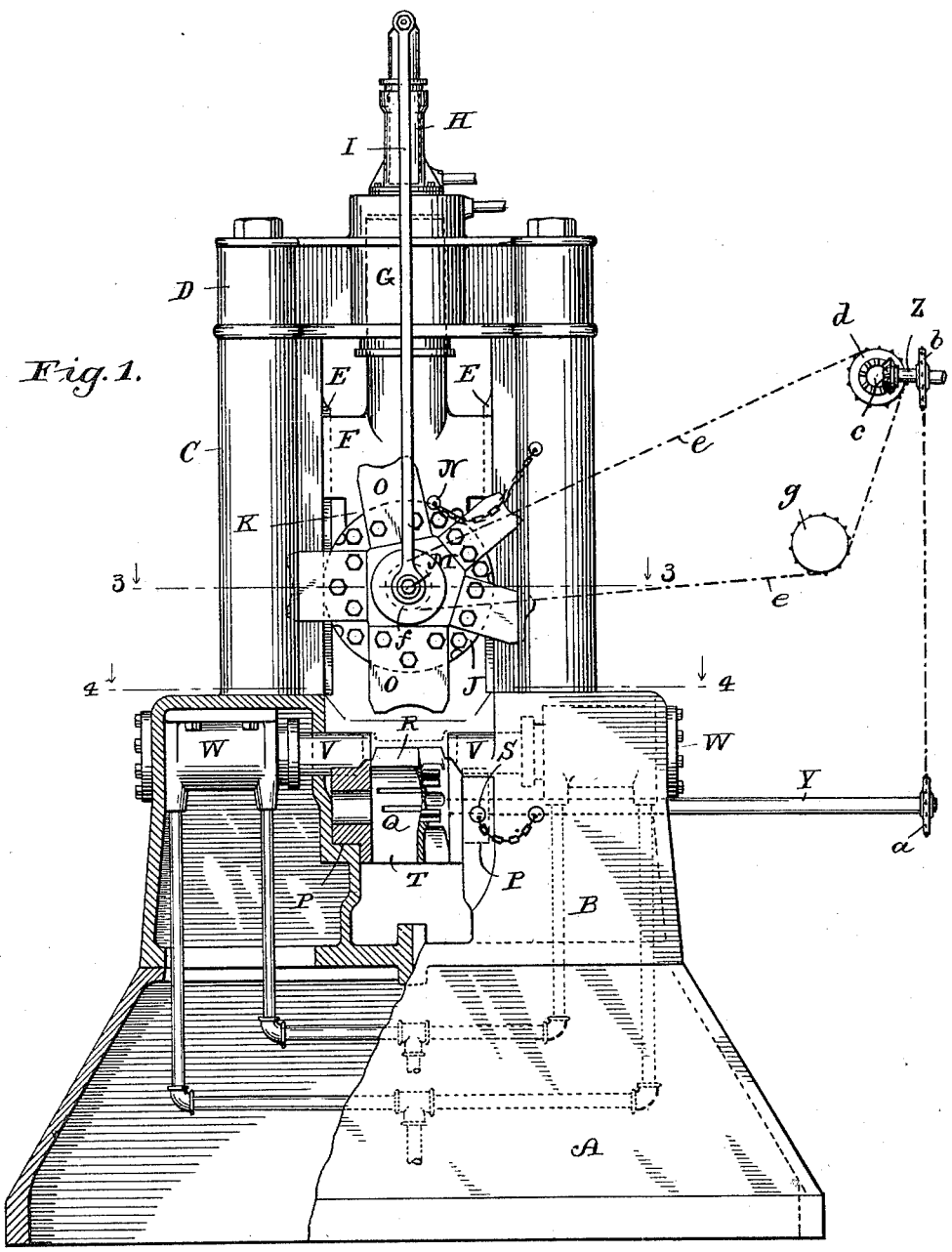

No. 626,448. Patented June 6, 1899.
G. B. TENNANT.
METAL SHEARING MACHINE.
(Application filed Apr. 10, 1899.)
(No Model.) 4 Sheets—Sheet 1.

WITNESSES, INVENTOR.

No. 626,448. Patented June 6, 1899.
G. B. TENNANT.
METAL SHEARING MACHINE.
(Application filed Apr. 10, 1899.)
(No Model.) 4 Sheets—Sheet 2.
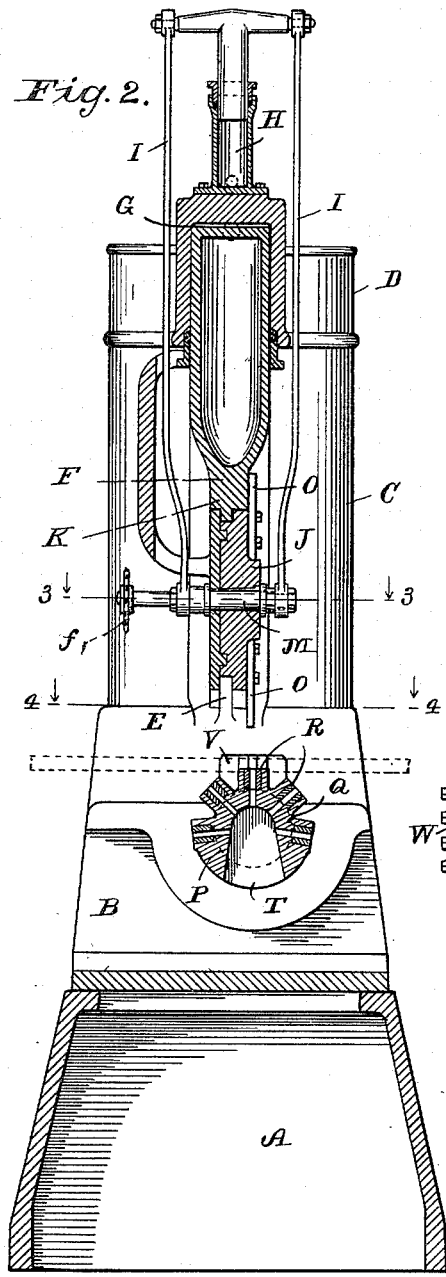
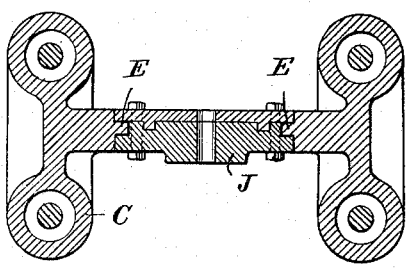
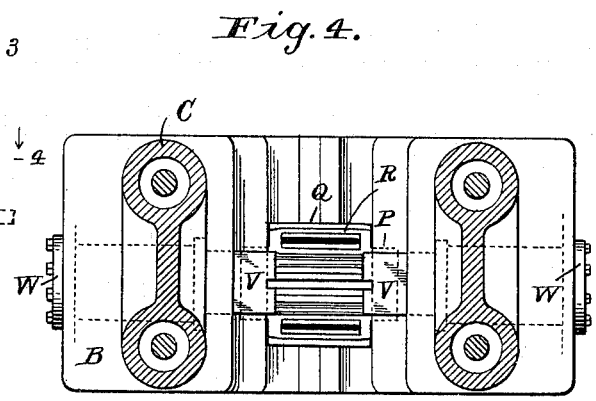
WITNESSES,
Harry D. Boyle
C. M. Newman
INVENTOR.
George B. Tennant No. 626,448. Patented June 6, 1899.
G. B. TENNANT.
METAL SHEARING MACHINE.
(Application filed Apr. 10, 1899.)

(No Model.) 4 Sheets—Sheet 3.

WITNESSES, INVENTOR.
Harry P. Boyle George B. Tennant
C. M. Newman

No. 626,448. Patented June 6, 1899.
G. B. TENNANT.
METAL SHEARING MACHINE.
(Application filed Apr. 10, 1899.)
(No Model.) 4 Sheets—Sheet 4.
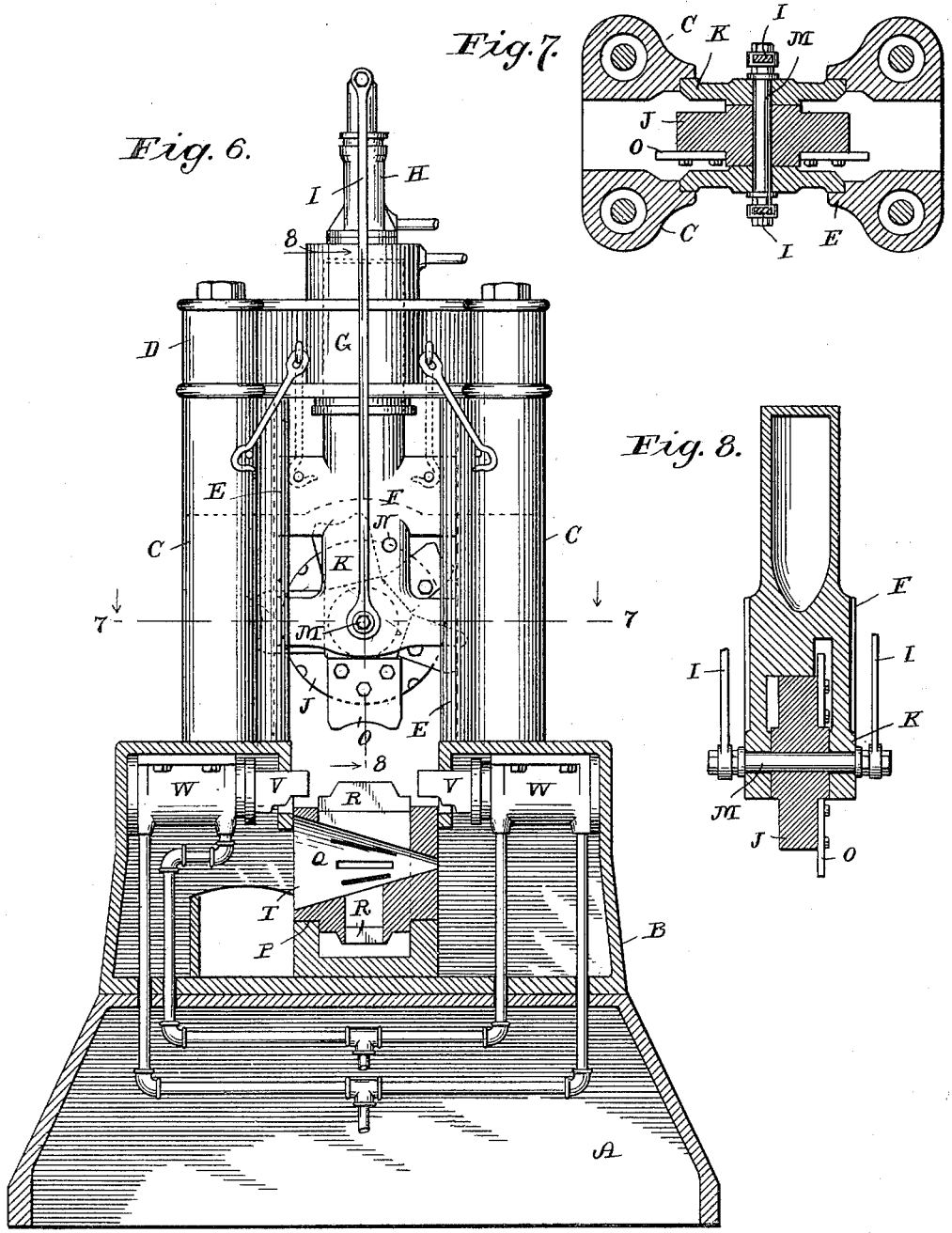
WITNESSES,
INVENTOR.

UNITED STATES PATENT OFFICE.

GEORGE B. TENNANT, OF JOHNSTOWN, PENNSYLVANIA.

METAL-SHEARING MACHINE.

SPECIFICATION forming part of Letters Patent No. 626,448, dated June 6, 1899.

Application filed April 10, 1899. Serial No. 712,425. (No model.)

*To all whom it may concern:*

Be it known that I, GEORGE B. TENNANT, a citizen of the United States, residing at Johnstown, in the county of Cambria and State of Pennsylvania, have invented certain new and useful Improvements in Metal-Shearing Machines; and I do hereby declare the following to be a full, clear, and exact description of the invention, such as will enable others skilled in the art to which it appertains to make and use the same.

My invention relates to new and useful improvements in metal-shearing machines, with particular reference to those designed for cutting steel I-beams, channels, rounds, squares, or other sections.

It is the object of my invention to produce a machine for the above purpose which is durable, simple, and accurate in operation, and particularly to construct said machine in such a manner as to adapt it to cut various sizes of material without the usual inconvenience, cost, and delay in removing and replacing the cutting knives or dies for various sizes and sections of material. In the execution of orders for certain kinds of steel bars, and particularly structural shapes—such as angles, beams, channels, Z-bars, T-bars, plates, squares, rounds, &c.—a large stock of long bars is usually kept on hand, from which are selected the various sizes necessary to fill an order, and said long bars are thereupon cut into the lengths required by means of a shear. In order to properly and expeditiously fill an order including a wide range of sizes, it has been customary to use a large number of shears or cutting-tools which work simultaneously on the different sections; but this necessarily requires a very large and expensive equipment. If, on the other hand, it is attempted to change the cutting-knives of one tool to suit the requirements of one or more particular orders for material, this is a long, tedious, and costly operation, during which the product of the plant is seriously reduced and the expense proportionately increased, for the reason that metal shears as heretofore constructed require that the top knives, the bottom knives, and the bed for the latter should be taken out and replaced by other sizes or shapes as may be necessary, which operation requires about an hour's time for the large tools adapted for cutting the heavier sections.

Although the drawings of my machine show it to be adapted for use in cutting I-beams, it may also be used for cutting any section of bars, and, further than this, it may be used for punching various sized or shaped holes, if desired. In order, however, to simplify this description and the drawings, I will confine myself to the explanation and illustration of its use in connection with shearing I-beams.

It is the object of my invention to obviate the difficulties above mentioned and to provide a shear the knives of which can be changed in a few seconds to cut any section desired.

With the above objects in view my invention resides and consists in the novel construction and combination of parts shown in the accompanying four sheets of drawings, which form part of this specification, and in which similar characters of reference denote like parts.

Figure 5:
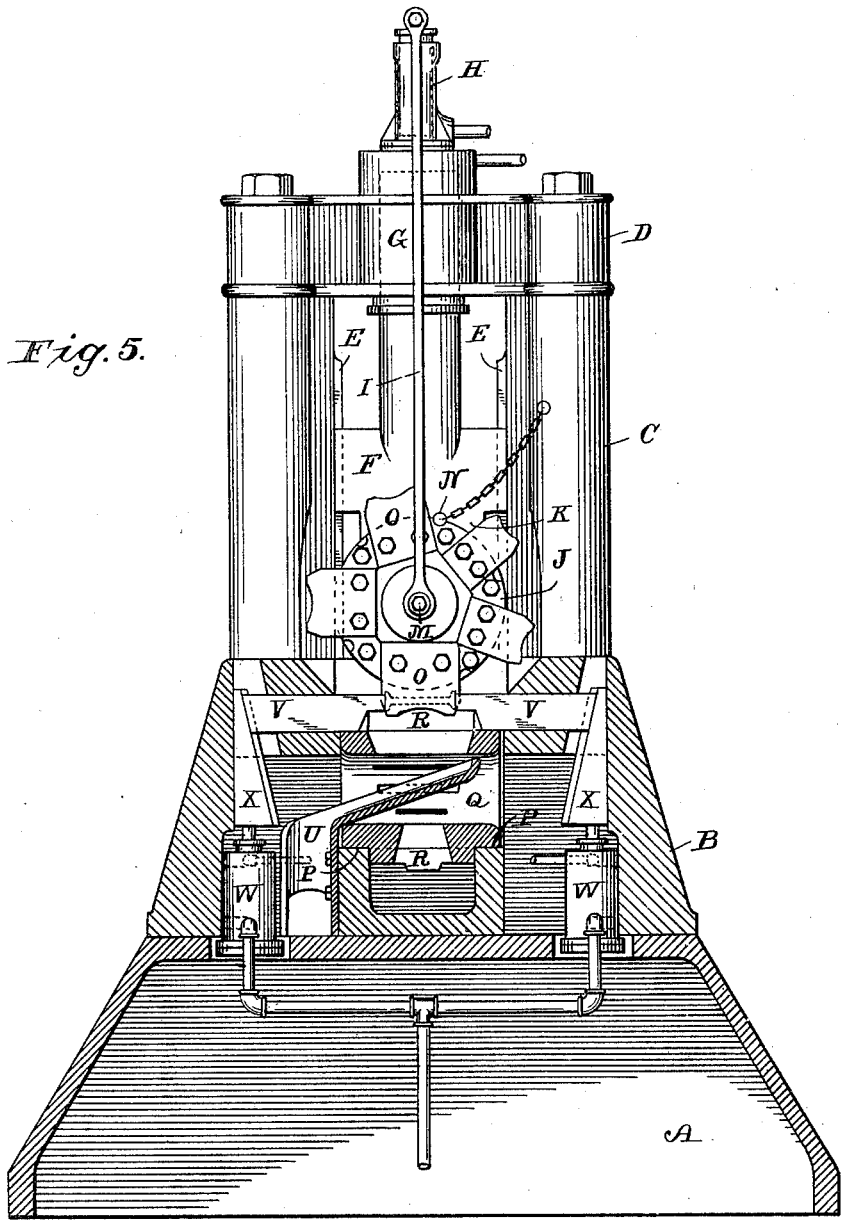

Referring now to the various sheets of drawings, Figure 1 is a front elevation of one form of my improved machine, the bed and base of which are broken away and shown in partial central vertical section. Fig. 2 is a central vertical cross-section through the machine shown in Fig. 1. Fig. 3 is a horizontal cross-section on the line 3 3 of Figs. 1 and 2. Fig. 4 is a horizontal sectional plan taken on the line 4 4 of Figs. 1 and 2. Fig. 5 is a front sectional elevation of a modified form of my machine, showing a different construction of the lower knife-holder or bottom turret and means for discharging the scrap from same, and it also shows a modified form of construction and operation for the side knives or clamps. Fig. 6 is a vertical sectional elevation of another modified form of my machine, showing still a different arrangement of the lower knife-holder or bottom turret and means for discharging the scrap from same, together with a modified form of the upper knife-holder or top turret, which latter is so constructed and arranged as to be removed and replaced in a manner different from that shown in the previous figures. Fig. 7 is a horizontal cross-section on the line 7 7 of Fig. 6. Fig. 8 is a central vertical cross-section through the lower plunger and upper knife-holder or top turret, taken on the line 8 8 of Fig. 6.

Referring now to the various characters of reference marked upon the different drawings, A is the base of my machine, which is shown to be made of a single casting.

B is the bed of the machine, and C is the upper frame, consisting of suitable uprights and the cross-head D, connecting the same at their tops. The uprights are each provided with a way or guide E, upon which the cross-head F slides. The cross-head F is operated downward for the purpose of producing a cut by the fluid-pressure cylinder G and is returned upward by the fluid-pressure cylinder H, both of which are connected with sources of fluid-pressure supply controlled by means of valves not shown on the drawings.

The smaller or counterbalance cylinder H has its plunger connected to the shear-head or cross-head by means of the links I, which are secured thereto by means of the shaft or pin M, which also passes through the adjustable upper knife-holder or top turret J, which latter is carried by the cross-head F aforesaid.

To the lower extension K of the cross-head F the adjustable upper knife-holder or turret J is attached and adapted to be turned on its shaft M and locked in proper position by means of the key N, the keyways in the cross-head F and the turret J being so located that the various blades or tools mounted on the turret J can be brought into proper operative position when the keyways in the different parts are contiguous, so that the key N may be introduced therein.

The top turret or upper knife-holder J carries upon it various sizes of blades or tools O, each of which is adapted for a particular size of work and which by turning the turret J can be brought into operative position so as to register with corresponding bottom knives R or dies in the block Q below.

Within the bed are formed suitable bearings P, in which the lower knife-holder or bottom turret Q is rotatably mounted, and said bottom turret Q contains a series of dies or lower knives R, of varying sizes to correspond with the upper knives O aforesaid. This lower turret Q is locked in its proper position by means of the key S, (shown in Fig. 1,) and the keyways in this and the bed B are so arranged that the various knives R can each be held in proper position to register with the corresponding knives O in the upper head.

The lower turret or die-block Q is preferably made hollow, and it may be either a portion of a cylinder, as shown in Figs. 1 and 2, or a complete cylinder with cylindrical interior, as shown in Fig. 5, or, again, it may be a cylinder with conical interior, as shown in Fig. 6.

I prefer to make the bottom die-block or turret Q hollow, and it may be open on one side, as shown at T on Figs. 1 and 2, so as to allow the scrap, cuttings, or punchings to drop therefrom, or it may be constructed so as to form a complete circle, as shown in Fig. 5, in which the bottom opening is omitted, and a trough U is provided to receive and convey the scrap from the die-block, or if constructed with the conical interior, as shown in Fig. 6, the pan or trough U may be dispensed with.

For the purpose of cutting beams, channels, or similar sections I provide the additional side clamps or side knives V, which are adapted to move inward and outward from the center of the machine by means of the fluid-pressure cylinders W, (shown in Figs. 1 and 6,) or they may be made to operate inward and outward from the center of the machine by the combination of the fluid-pressure cylinders W and the wedges X, as illustrated in Fig. 5. In certain cases these side knives may be stationary and without the adjustment or clamping action of the cylinders W and their connections or the equivalents of said cylinders.

In order to quickly and easily change the position of both the top turret or upper blade-holder J and the bottom turret or lower knife-holder Q and to further insure the registration of the proper size of upper blades O with the corresponding sizes of bottom blades R, I provide driving connections, as shown in Fig. 1, which consist of a horizontal shaft Y, one end of which is directly connected with the lower turret or die-holder Q, and upon the outer end of the shaft is mounted a sprocket-wheel $a$, having driving connections with a similar sprocket $b$ on the short shaft Z, which may be driven by means of a hand-wheel or any suitable power. The shaft Z is provided with a bevel-gear connection $c$ to convey power to a third sprocket-wheel $d$, mounted at right angles to said shafts, which latter sprocket is provided with driving connections $e$ to a like wheel $f$, which is secured to the shaft M, which supports the top turret or upper blade-holder J. The idler wheel or pulley $g$ is provided for the purpose of taking up the slack occasioned by moving the cross-head J or by reason of wear in the parts.

Having thus described the construction of my machine, I will proceed to describe its operation; but for the purpose of simplifying the description I will limit myself to an explanation of its use for cutting I-beams, although it may be adapted to cut any other sections, if desired.

The upper blade-holder or top turret J and the lower die-holder or bottom turret Q are first set so that the proper sizes of knives will register exactly the one with the other, after which a beam is passed over the top of the lower knife to the proper point for being cut, whereupon the side knives or clamps V are brought up forcibly against the beam-flanges by means of the fluid-pressure cylinders W and their connections, after which the pressure is admitted to the large cylinder G, which moves the cross-head F downward, together with the knives carried thereby, whereupon the upper knife O cuts through the beam-web first, after which the flanges are severed by the combined action of the inclined portions at the sides of the knife O and the side knives or clamps V. After this is done the pressure is withdrawn from the large cylinder G, whereupon the cross-head and upper knife are withdrawn upward by the action of the cylinder H, in which a constant pressure is maintained.

Although I have shown and described my machine with two turrets, one for the top knives and one for the bottom knives or dies, I do not limit myself to this exact combination, as either one or the other of said turrets may be dispensed with, if considered desirable for the use intended. Both the top and bottom turrets of my improved machine are so arranged that either of them may be replaced entirely, together with the knives or dies which it holds, and quickly replaced by others fitted with different knives or dies for cutting other sizes or sections of materials, so that my machine is universal in its application.

Although I have shown my machine as fitted with two sets of adjustable side knives, one on each side, I do not limit myself to this construction, as one of said sets may be omitted, if desired or rendered necessary by the character of the work or otherwise, or one of them may be arranged in a fixed position and the other made adjustable only, as may be readily understood by one skilled in the art to which my invention appertains.

Having thus described my invention, what I claim, and desire to secure by Letters Patent, is—

1. In a metal-shear, the combination of a bottom turret provided with a series of various-sized knives or dies, one or more side knives adapted to engage the side of the bar to be cut, a top knife, and means for imparting a reciprocating movement to said top knife.

2. In a metal-shear, the combination of a bottom turret provided with a series of various-sized knives or dies, one or more side knives provided with means for clamping the same against the sides of the bar to be cut, a top knife, and means for imparting a reciprocating movement to said top knife.

3. In a metal-shear, the combination of a bottom turret provided with a series of various-sized knives or dies, one or more side knives provided with means for clamping the same against the sides of the bar to be cut, a top turret provided with a series of various-sized knives or blades, and means for imparting a reciprocating motion to said top turret and the knives carried thereby.

4. In a metal-shear the combination of a revoluble bottom turret provided with a series of various-sized knives or dies, one or more side knives provided with means for clamping the same against the sides of the bar to be cut, a top revoluble turret provided with various-sized knives or blades, means for imparting a reciprocating motion to said top turret and the knives carried thereby, together with connections between said turrets so that the various sizes in each turret will properly register with the corresponding sizes in the other turret.

5. In a metal-shear the combination of a revoluble bottom turret provided with various-sized knives or dies, one or more side knives provided with means for clamping the same against the sides of the bar to be cut, a revoluble top turret provided with various-sized knives, means for operating said top turret for making the cut, consisting of a fluid-pressure cylinder connected therewith, controlled by suitable valves for producing the downward or cutting stroke, and another fluid-pressure cylinder connected with said top turret for withdrawing the knives to their normal or inoperative position.

6. In a beam-shear of the class described, the combination of a revoluble die-block containing a series of different-sized dies or knives, one or more side knives provided with means for clamping the same against the flanges of a beam, a revoluble holder provided with a series of knives and mounted in suitable ways or guides, fluid-pressure cylinders connected with said holder so as to impart both a forward and backward movement to the same.

7. In a beam-shear, the combination of a revoluble changeable die-block provided with a series of various-sized knives or dies, one or more side knives and means for clamping the same against the beam-flanges, a revoluble, changeable blade-holder provided with a series of different-sized knives to correspond with those in the die-holder, said blade-holder being mounted in a reciprocating cross-head and means for operating said cross-head to and fro.

8. In a beam-shear of the class described a series of different-sized dies mounted in an adjustable holder, a knife or blade secured to a blade-holder mounted between suitable ways of the frame, a fluid-pressure cylinder and connections attached to said blade-holder to operate the same during its cutting stroke, and a secondary fluid-pressure cylinder and connections also attached to said blade-holder to return the same to its normal or non-operative position.

9. In a beam-shear of the class described, a die-block revolubly mounted in the base thereof and provided with a series of different-sized knives or dies, one or more side knives with apparatus for clamping and operating upon the sides of the bars to be cut consisting of fluid-pressure cylinders and connections, a reciprocating blade-holder carrying various sizes of blades to correspond with those in the bottom die-block, and means for operating said blade-holder.

10. In a metal-shear of the class described, the combination with a cutting-knife and means for operating the same, of a revoluble die-holder mounted in suitable bearings supported in the frame, said die-holder being annular as to its general form, and having a central opening into which the scrap or cuttings are delivered, and an inclined trough or pan located within said central opening for discharging said scrap therefrom.

11. In a metal-shear of the class described the combination with a cutting-knife and means for operating the same, of a revoluble bottom die-holder mounted in suitable bearings supported in the frame, said die-holder being cylindrical as to its general external form and provided with a conical opening forming its interior surface into which the scrap or cuttings are delivered and by means of which conical surface said scrap or cuttings are discharged therefrom.

In testimony whereof I affix my signature in the presence of two witnesses.

GEORGE B. TENNANT.

Witnesses:
D. J. JONES,
FRANK M. BUCHANAN.